Figure 1:
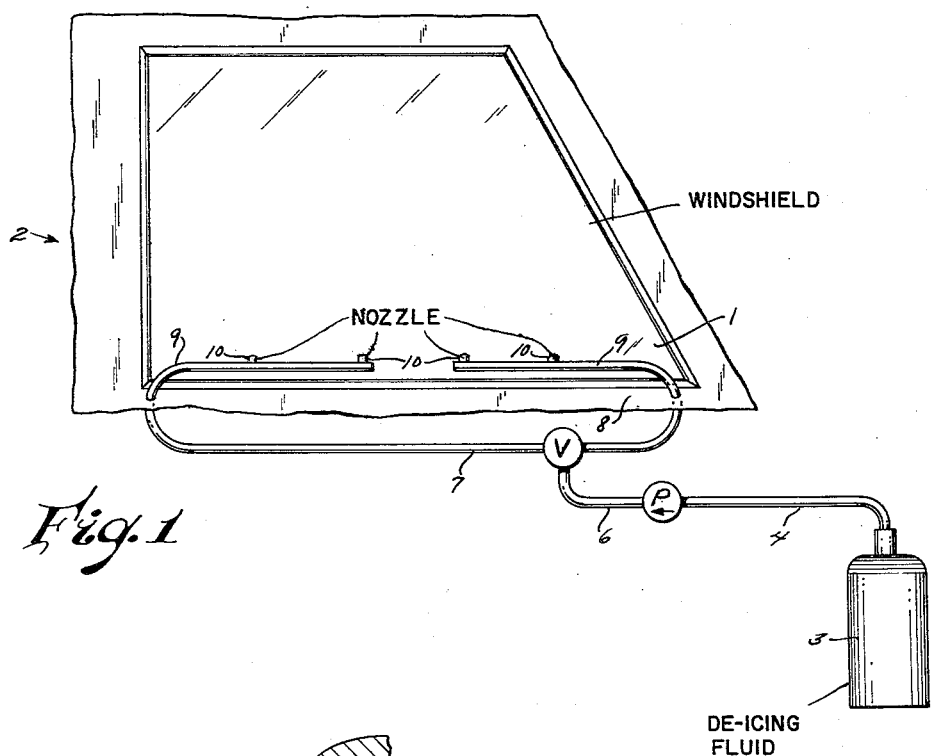

Dec. 26, 1961     T. H. McCONICA III     3,014,814

METHOD OF DE-ICING A SURFACE

Filed Nov. 19, 1958

INVENTOR.
Thomas H. McConica, III
BY
Learman, Learman & McCulloch
ATTORNEYS 3,014,814
METHOD OF DE-ICING A SURFACE
Thomas H. McConica III, Box 89, Clare, Mich.; William C. McConica executor of said Thomas H. McConica, deceased
Filed Nov. 19, 1958, Ser. No. 775,034
6 Claims. (Cl. 117—104)

This invention relates to means and methods for controlling the icing of aircraft and other surfaces where ice accretion is undesirable.

For many years both military and commercial aircraft of substantial size have been equipped with means for controlling the accretion of ice on various aircraft surfaces. Such aircraft, until recently, normally flew at altitudes where icing conditions might be encountered at any time during the period of flight. In recognition of this possibility, various kinds of de-icing apparatus and methods, such as liquid and thermal de-icers, have been proposed and adopted, but the great majority, if not all, of such ice control systems have been designed for use with large aircraft having extensive surface areas requiring de-icing. Consequently, ice control systems necessarily have been fairly complex, expensive, and quite heavy in weight.

Heretofore, very little has been done in connection with providing ice protection systems for lighter aircraft. This is due principally to the fact that such aircraft were designed, powered and instrumented for operation under weather conditions where icing did not present any appreciable problem. Very recently, however, great strides have been made in aviation with respect both to large and small aircraft and the requirements for protection against icing have changed drastically. For example, large commercial and military planes of both propeller-driven and jet type now cruise at altitudes where icing does not occur and, consequently, require ice control systems only during the relatively short periods of time when they are making their landing descent and approach. Moreover, miniaturization of flight instruments through the use of transistors and other improvements now makes feasible their incorporation in the lighter airplanes with the result that the latter now would be capable of all-weather operation were it not for the hazard of icing which frequently exists in instrument weather.

Since large aircraft now require ice control systems only during the final few minutes of a flight, it obviously is poor economy to require such aircraft to carry the weight associated with a full-time protection system. Moreover, while an ice controlling system now is needed for lighter aircraft, it would be uneconomical to install heavy, full-time ice control apparatus of the kind in use heretofore on larger aircraft. An object of this invention, therefore, is to provide de-icing apparatus suited to the needs of both large and small aircraft.

Ice control, while important with respect to aircraft, is not a problem which is exclusive thereto. For example, land type vehicles used in frigid areas such as the Arctic and Antarctic frequently require the removal of ice from their windshields, windows and other surfaces. Accordingly, another object of this invention is to provide means and methods which are adaptable not only to aircraft, but also to other types of vehicles.

As has been indicated above, liquid de-icers have been in use for some time. One of the difficulties with liquid deicing systems in use heretofore was the large amount of fluid required to remove accretions of ice. The necessity of using a large amount of fluid to remove the ice required, naturally, that a considerable quantity of the fluid be carried at all times. Any vehicle, whether it be air or land, is capable of carrying only so much load, so pay-load had to be sacrificed in order to enable the vehicle to carry the large amount of de-icing fluid necessary for operation of the conventional de-icing systems. A particular object of this invention, therefore, is to provide de-icing means and apparatus of the fluid type and in which only a small fraction of the fluid required heretofore is necessary to proper operation of the system.

The manner of formation of ice on aircraft surfaces, for example, is a gradual accretion of ice on the external aircraft surface in a direction away from the latter. The easiest manner of removing ice formed in this way is to melt the substrata so as to destroy the bond between the ice and the surface to which it is adhered. It had been proposed heretofore to exude a de-icing fluid through a porous surface so as to destroy the bond between the surface and ice adhered thereto, but it is quite apparent that this method is not feasible in removing ice from the surfaces of windshields and the like. Another object of this invention, therefore, is to provide methods and apparatus which are capable of removing ice from windshields and other non-porous surfaces by introducing de-icing fluid to the interface of the surface and the ice adhered to the latter.

Research made by applicant in the field of ice removal indicated that de-icing of surfaces could be enhanced if the surface had a high-contact angle, or low work of adhesion, to water. A high-contact angle not only would reduce the tendency of ice to adhere to the surface, but would facilitate the penetration of a de-icing fluid between the surface and the ice sheet and hence aid in the shedding of the ice. In other words, it appeared logical that if the surface having a tendency to collect ice could be rendered at least partially hydrophobic, the task of controlling icing of such surface would be simplified. Accordingly, another object of the invention is to provide means and methods for rendering a surface hydrophobic.

It has been found that certain substances, when applied to the surfaces of optical devices such as spectacles, actually improve the optical characteristics of such devices. For example, the use of silicone-treated tissues known as "Sight Savers" to clean the lenses of spectacles deposits a thin silicone coating on the lenses and improves visibility. Improved visibility of windows and windshields of land and air vehicles is a desirable characteristic, so another object of this invention is to provide de-icing means and methods which improve visibility through windshields and other transparent substances.

Figure 2:
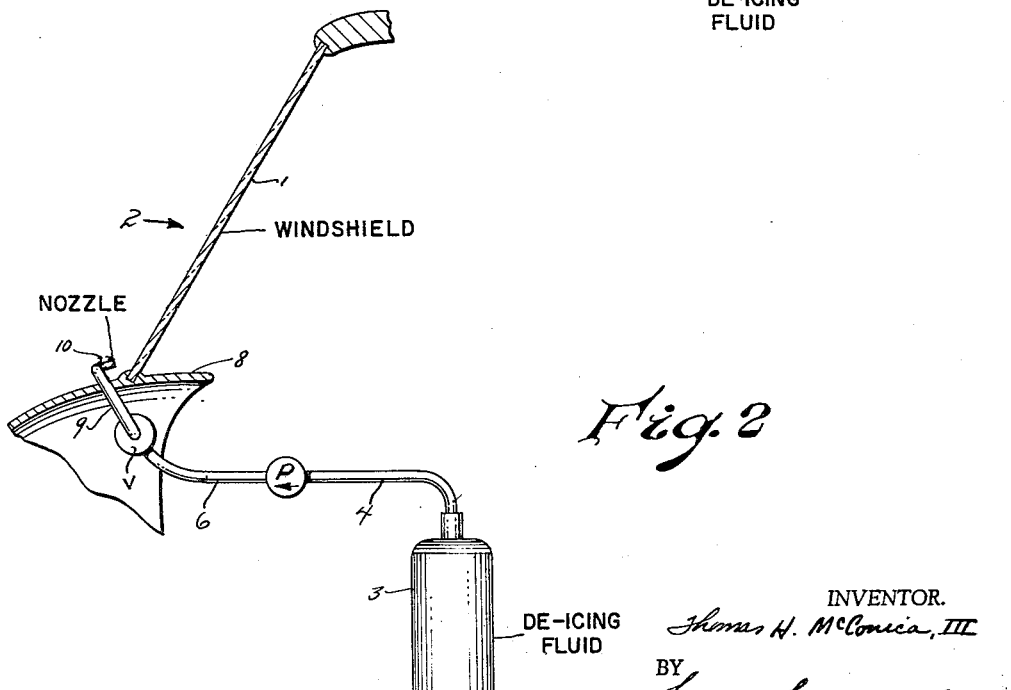

Other objects and advantages of the invention will be pointed out specifically or will become apparent from the following description when it is considered in conjunction with the appended claims and the accompanying drawing, in which:

FIGURE 1 is a fragmentary, somewhat diagrammatic elevational view of apparatus constructed and arranged in accordance with the invention; and FIGURE 2 is a fragmentary, sectional view of the apparatus shown in FIGURE 1.

For purposes of illustration, the invention is shown as being adapted for use in conjunction with the windshield 1 of an aircraft 2. It should be understood, however, that the invention is not limited either to windshields or to aircraft, but is capable of use in controlling the formation of ice on practically any surface which is capable of resisting whatever deleterious effects, if any, might attend the de-icing fluid.

Apparatus constructed in accordance with the illustrative embodiment of the invention comprises a suitable tank or container 3 in which de-icing fluid may be stored in a convenient place within the vehicle. The de-icing fluid will be described in greater detail hereinafter. A suitable tube 4 leads from the container 3 to the intake side of a pump P of known kind which is capable of developing pressure preferably in excess of 1000 p.s.i. The discharge side of the pump is connected by means of a tube 6 to a distributing conductor 7 which, as shown, may pass from the cabin of the aircraft through the cowling 8 so as to position portions 9 of the distributing tube externally of and adjacent to the lower edge of the windshield 1. If desired, a valve V may be located at the juncture of the conductors 6 and 7 to direct the fluid either to the left or to the right, as viewed in FIGURE 1. The ends of the tube portions 9 are closed or plugged in any conventional manner and the tube portions 9 may be provided with a suitable number of discharge nozzles 10 of known construction which are so spaced from one another as to permit fluid discharged through the nozzles to cover substantially the entire surface of the windshield in a manner yet to be described.

The basic freezing point depressant of which the de-icing fluid may be composed preferably are selected from the class of alcohols and glycols. For example, commercial grade isopropanol functions satisfactorily on a glass surface, but possibly could exert some deleterious action on non-glass surfaces such as "Plexiglas," whereas another, less volatile de-icing liquid such as ethylene glycol and glycol mixtures may be just as or more effective ice-melting agents, but are not likely to subject such surfaces to damaging action.

The de-icing fluid preferably contains a hydrophobic substance of less volatility than the freezing point depressant and which is capable of depositing an optically clear film on the surface being treated. One substance which is capable of functioning in the desired manner is a dimethyl silicone fluid manufactured by Dow Corning Corporation and identified by the manufacturer as 200 series, 350 ctsk. grade. This particular silicone fluid is not the only hydrophobic film-forming agent which may be used, but it does induce a high degree of hydrophobicity on a glass or "Plexiglas" surface, which means that the contact angle made by water with the treated surface may be increased materially over the contact angle of an untreated surface. For example, untreated "Plexiglas" panels having usual contact angles against water of around 70° were treated with the hydrophobic film-forming agent referred to above and then exhibited a contact angle of about 100°.

The amount of Dow Corning Series 200 fluid necessary to produce the desired result is very small compared to the amount of freezing point depressant fluid. In one experiment the amount of such silicone fluid necessary to produce the desired result was less than 0.01%, by weight, of the de-icing fluid.

In a typical installation, such as is shown in the drawing, the tank 3 will contain commercial grade isopropanol and a trace of Dow Corning Series 200 fluid. The nozzles 10 will all be of substantially uniform size and will have discharge orifices so arranged as to direct a jet of the fluid toward the surface 1 to be treated at an angle of incidence in the neighborhood of 45°. The apparatus need not be operated until some ice has formed on the external surface of the windshield 1 or other surface. When some ice has formed on the surface, however, the apparatus may be conditioned for operation by setting the valve V and starting the pump P so as to cause fluid to be delivered through the nozzles 10 towards the outer surface at a selected side of the windshield 1. These operations can be performed either manually or by automatic devices. The pressure at which the fluid is delivered through the nozzles will vary according to the pump capacity and to the sizes of the discharge openings of the nozzles, but in any event the pressure should be such that the fluid will be discharged through the nozzles in a thin stream or jet with sufficient velocity to bore a small hole in the ice and penetrate the latter to the surface 1 without any extensive incidental melting of the ice around the point of impingement. When the hole has been bored completely through the ice, the force and velocity of the jet should be such that the pressure of the fluid at the bottom of the hole will be sufficiently high to cause the liquid to spread or fan out between the ice sheet and the windshield surface. The presence of the hydrophobic film-forming agent greatly facilitates the spreading of the fluid between the ice sheet and the windshield. Inasmuch as the fluid is spread between the glass and the ice, the substrata of the ice is melted and the bond between the ice and the windshield surface is destroyed, whereupon the sheet of ice may blow or fall away.

After the ice sheet has been removed from the surface 1, the freezing point depressant will dissipate prior to the dissipation of the hydrophobic film-forming agent. When a silicone fluid of the type referred to above was used, the film-forming agent left a thin, optically clear film on the windshield which improved its visibility, made the surface more resistant to the formation of ice thereon than it had been before inasmuch as it then had a higher contact angle to water, and increased the effectiveness of subsequent use of the ice-removing apparatus.

In comparison tests of the invention with conventional types of de-icing apparatus it was found that apparatus constructed and used in accordance with the invention produced results vastly superior to the conventional systems. For example, when commercial grade isopropanol was sprayed through a nozzle having a diameter of about 0.04 inch on a glass panel having a coating of ice approximately ⅛ inch thick and wherein the pressure at which the fluid was pumped was about 50 p.s.i., the jet of fluid issuing from the nozzle impinged upon the ice surface and gradually melted the ice in the immediate vicinity of the jet. Melting of the ice took place in a direction from the outer surface of the ice towards the surface of the glass in the manner of conventional systems used for de-icing glass surfaces. After the expenditure of about 500 cc. of the fluid, the de-iced area was about two square inches. The angle of incidence of the jet was varied, but did not seem to make any observable difference. Next, a second test panel similar to the first was used and a nozzle having a smaller discharge orifice was substituted for the first nozzle. The same kind of fluid used before was pumped through the smaller nozzle at a pressure of between 500 and 1000 p.s.i. and with the nozzle inclined to the test panel in such manner that the angle of incidence of the jet stream was approximately 45°. The high pressure jet almost immediately bored a small hole in the ice and the fluid spread fanlike between the glass and the sheet of ice from the point of impingement and enabled almost the entire ice sheet to be released in a fraction of a second. The total amount of fluid consumed was less than 50 cc. The experiment was repeated several times with the angle of incidence of the jet being varied. When the jet was perpendicular to the test surface, the fluid spread slowly and radially from the point of impingement, but when the fluid was directed at the test panel at an angle of incidence, the results were generally the same as when the angle of incidence was approximately 45°. It was found that best results could be obtained when the angle of incidence of the jet was in the range of 25° to 55°.

In another experiment, a test panel similar to the panels previously used but having a film of Dow Corning 200 Series, 350 ctsk. grade silicone fluid thereon was coated with an ice coating at least as thick as ⅛ inch. Using the same equipment described in the preceding paragraph, but a pressure of about 800 p.s.i., and with the nozzle so arranged that the jet of fluid made an angle of incidence of about 45° with the test panel, the jet stream almost immediately penetrated the ice and spread between the ice and the surface of the test panel, enabling the sheet of ice almost immediately to be removed from the panel. Less than 20 cc. of fluid were required to effect removal of the film of ice in this manner.

Tests have shown that the crux of the invention is the use of a high pressure, high velocity jet of de-icing fluid, the velocity being such that the jet is enabled to bore a small hole in the ice coating and being so located relatively to the surface to be de-iced that the fluid is able to spread between the ice sheet and the surface and destroy the bond between the sheet of ice and the surface. Tests also have shown that the higher the pressure, the better the de-icing system operates, and that the velocity must be such that sufficient pressure is built up at the base of the small hole in the ice to force the fluid to spread from the point of impingement. The spreading of the fluid is facilitated if the jet stream is located at a medium angle of incidence to the surface to be de-iced, and it has been found that the most efficient angle of incidence is in the range of 25° to 55°. The exact size of the nozzle orifice may vary, as may the pressure at which the fluid is discharged. As has been pointed out, the critical characteristic is penetration of the ice by the jet to the iced surface without appreciable melting in the zone of the jet and at sufficient pressure to spread the fluid between the ice and the surface. Thus, it is not applicant's intention to limit the invention unnecessarily to any particular size orifice or pressure, but he has found that nozzles having orifice sizes ranging from 0.013 inch to less than 0.04 inch perform satisfactorily at pressures ranging from about 250 p.s.i. to more than 1000 p.s.i.

The invention has been disclosed for use in conjunction with an aircraft windshield, but it is believed to be clear that the invention is adapted for use on any surface capable of resisting any harmful effects of the freezing point depressant. Accordingly, this disclosure is intended to be illustrative of the invention rather than definitive thereof. The invention is defined in the claims.

I claim:

1. A method of de-icing a surface having a coating of ice thereon, said method comprising directing a thin, high velocity jet of de-icing fluid toward the coated surface at a pressure and an angle of incidence that said fluid impinges against and bores through said coating and spreads fan-wise therefrom between said surface and said coating without any appreciable melting of said coating in the zone of impingement.

2. The method set forth in claim 1 wherein said de-icing fluid is directed toward said coated surface at an angle of incidence between 25° and 55°.

3. The method set forth in claim 1 wherein said de-icing fluid is directed toward said coated surface at a pressure in excess of 250 p.s.i.

4. The method set forth in claim 1 wherein said fluid contains a hydrophobic film-forming agent.

5. A method of de-icing a surface having a coating of ice thereon, said method comprising directing a thin, high velocity jet of de-icing fluid toward said coated surface at a pressure in excess of 250 p.s.i. and at an angle of incidence between 25° and 55° whereby said fluid impinges against and bores through said coating and spreads fan-wise between said coating and said surface without any appreciable melting of said coating in the zone of impingement.

6. The method set forth in claim 5 wherein said fluid contains a hydrophobic film-forming agent.

References Cited in the file of this patent

UNITED STATES PATENTS

| | | |
|---|---|---|
| 1,346,638 | Crook et al. | July 13, 1920 |
| 1,355,791 | Berliner | Oct. 12, 1920 |
| 1,720,140 | O'Conner | July 9, 1929 |
| 2,012,218 | Burress | Aug. 20, 1935 |
| 2,312,187 | Patterson | Feb. 23, 1943 |
| 2,346,891 | Adlington | Apr. 18, 1944 |
| 2,428,917 | McFarland | Oct. 14, 1947 |
| 2,575,141 | Johannsen | Nov. 13, 1951 |
| 2,651,856 | Newton | Sept. 16, 1953 |
| 2,777,772 | Stedman | Jan. 15, 1957 |

FOREIGN PATENTS

| | | |
|---|---|---|
| 595,278 | Great Britain | Dec. 1, 1947 |
| 760,573 | Great Britian | Nov. 7, 1956 |

OTHER REFERENCES

Dow Corning Silicone Notebook, Fluid Series #3, issued September 1948, pages 10 and 21.